(12) United States Patent
G

(10) Patent No.: US 12,146,801 B2
(45) Date of Patent: Nov. 19, 2024

(54) TEMPERATURE-BASED TAMPER DETECTION

(71) Applicant: Texas Instruments Incorporated, Dallas, TX (US)

(72) Inventor: Anand Kumar G, Bengaluru (IN)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 427 days.

(21) Appl. No.: 17/355,992

(22) Filed: Jun. 23, 2021

(65) Prior Publication Data

US 2022/0412814 A1  Dec. 29, 2022

(51) Int. Cl.
*G01K 7/42* (2006.01)
*G01K 1/022* (2021.01)
*G06F 12/16* (2006.01)

(52) U.S. Cl.
CPC .......... *G01K 7/425* (2013.01); *G01K 1/022* (2013.01); *G06F 12/16* (2013.01)

(58) Field of Classification Search
CPC ........ G01K 7/425; G01K 1/022; G01K 3/005; G01K 3/08; G01K 7/34; G01K 7/346; G06F 12/16; G06F 13/24; G06F 1/06; G06F 11/3024; G06F 11/3058; G06F 11/3495; G06F 21/57; G06F 21/71; G06F 21/75; G06F 2221/034; G08B 21/182; G01D 3/0365; G01D 3/08; G01M 99/002; H03K 17/22; H03K 17/223; H01L 23/34; Y02D 10/00

(Continued)

(56) References Cited

U.S. PATENT DOCUMENTS 3,566,079 A * 2/1971 O'Neill ............... G01K 7/21
 219/505
6,278,302 B1 * 8/2001 El-Kik ............... H03K 17/22
 327/143

(Continued)

OTHER PUBLICATIONS

"Analysis and Design of Analogue Integrated Circuits", P R Gray, P J Hurst, S H Lewis and R G Meyer, John Wylie, 4/E 2001, Chapter 4 (Year: 2001).*

(Continued)

*Primary Examiner* — Lisa M Caputo
*Assistant Examiner* — Eric Sebastian Von Wald
(74) *Attorney, Agent, or Firm* — Michael T. Gabrik; Frank D. Cimino

(57) ABSTRACT

A temperature sensing device for a temperature-based tamper detection system includes an integrated circuit (IC) and a logic circuit. The logic circuit sends an enable signal to the IC, causing it to measure the device temperature, and initiates a security timer. In response to not receiving the device temperature before the security timer expires, the logic circuit outputs a tamper event signal and an error code. The logic circuit can disable the enable signal in response to not receiving the device temperature before the timer expires. In some implementations, the logic circuit is a first logic circuit, and the IC includes an analog integrated circuit (AIC) and a second logic circuit. The second logic circuit receives the enable signal from the first logic circuit, causes the AIC to measure the device temperature, and outputs a ready signal and the device temperature to the first logic circuit.

22 Claims, 4 Drawing Sheets

(58) Field of Classification Search
USPC .......................................................... 374/170
See application file for complete search history.

(56) References Cited

U.S. PATENT DOCUMENTS

| | | | | |
|---|---|---|---|---|
| 6,974,252 | B2* | 12/2005 | Bowden | G01K 3/005 |
| | | | | 374/163 |
| 7,362,248 | B2* | 4/2008 | McClure | G01K 3/005 |
| | | | | 341/127 |
| 9,299,451 | B2* | 3/2016 | Hebig | G11C 17/16 |
| 9,818,004 | B1* | 11/2017 | Rezayee | G06K 7/0095 |
| 2006/0002218 | A1* | 1/2006 | Jain | G01K 7/34 |
| | | | | 257/E23.08 |
| 2007/0103249 | A1* | 5/2007 | Lee | G01K 7/346 |
| | | | | 331/176 |
| 2009/0049220 | A1* | 2/2009 | Conti | G06F 13/24 |
| | | | | 710/267 |
| 2016/0283751 | A1* | 9/2016 | Arora | G06F 21/71 |
| 2018/0089425 | A1* | 3/2018 | Trikalinou | G06F 21/70 |

OTHER PUBLICATIONS

Kumar, G. Anand. "Secure, Scalable and Low-Power Junction Temperature Sensing for Multi-Processor Systems-on-Chip." 2020 21st International Symposium on Quality Electronic Design (ISQED) (2020): 179-182. (Year: 2020).*

ISQED 2020: Program. (n.d.). In ISQED. 2020 International Symposium on Quality Electronic Design, Santa Clara Convention Center, United States of America. https://www.isqed.org/English/Archives/2020/Technical_Sessions/accepted.html (Year: 2020).*

21st ISQED Transcript of Secure, Scalable and Low-Power Junction Temperature Sensing for Multi-Processor Systems-on-Chip to G. Anand Kumar for Texas Instruments India Pvt. Ltd. (Year: 2020).*

* cited by examiner

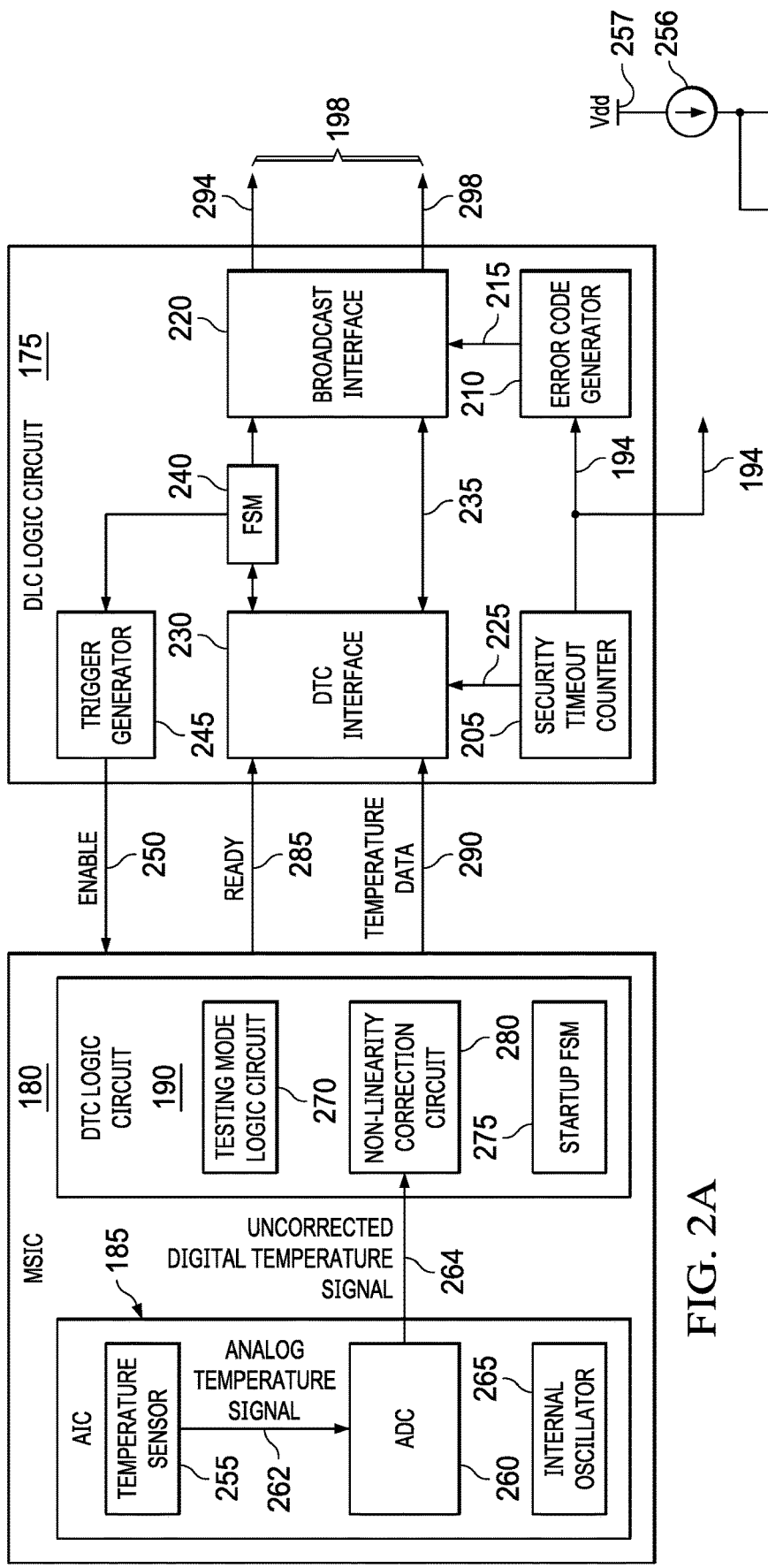
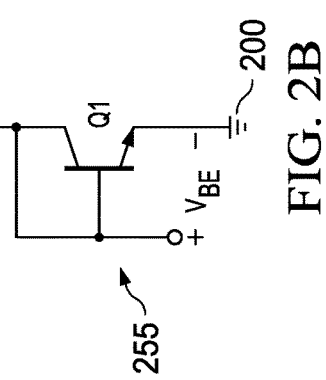
FIG. 2A
FIG. 2B

TEMPERATURE-BASED TAMPER DETECTION

BACKGROUND

As the Internet of Things (IoT) spreads and devices with sensitive information become ubiquitous, many microcontrollers used in IoT and other secure embedded applications include tamper detection systems to protect the sensitive information from attack. One method of tampering is to vary the device operating temperature drastically, outside the valid operating temperature range, causing the device to malfunction. For example, a temperature-based tamper attack can cause the device to boot in an insecure manufacturing state rather than a secure in-field state, allowing the attacker to manipulate device operation. As another example, a temperature-based tamper attack can freeze a device, allowing the attacker to exploit data permanence and access cryptographic keys and sensitive information stored on a random access memory cell. Many devices include a temperature sensing system to detect temperature-based tamper attacks and deploy appropriate counter measures, such as deleting the sensitive information or presenting an alert to a user.

However, those techniques depend on a reliable temperature sensing circuit and cannot detect a subsequent temperature-based tamper attack after a prior attack that disables the temperature sensing circuit. For example, an alpha radiation attack can disrupt enable and ready signals within the temperature sensing circuit, and a supply voltage attack can disable voltage-sensitive components within the temperature sensing circuit.

SUMMARY

The disclosed temperature sensing device includes an integrated circuit (IC) configured to measure a device temperature and a logic circuit. The logic circuit sends an enable signal to the IC to cause it to measure the device temperature. In response to sending the enable signal, the logic circuit initiates a security timeout countdown. In response to not receiving the device temperature from the IC before the security timeout countdown ends, the logic circuit outputs a tamper event signal and an error code.

In some examples, the logic circuit disables the enable signal in response to not receiving the device temperature from the IC before the security timeout countdown ends. The temperature sensing device can also include an error signaling circuit that stores an error handling policy indicative of a desired system response to a tamper event signal. The error signaling circuit receives the tamper event signal from the logic circuit and performs an operation based on the stored error handling policy. The temperature sensing device can also include an anti-tamper circuit in some examples. The anti-tamper circuit stores a security policy indicative of a desired security response to the error code, receives the error code from the logic circuit, and performs an operation based on the stored security policy.

The logic circuit receives the device temperature from the IC and outputs the device temperature. The anti-tamper circuit stores a high temperature threshold and a low temperature threshold and receives the device temperature from the logic circuit. The anti-tamper circuit compares the device temperature to the high temperature threshold and the low temperature threshold, and in response to the device temperature being greater than the high temperature threshold or lower than the low temperature threshold, performs an operation based on the stored security policy.

In some implementations, the logic circuit is a first logic circuit and the IC includes an analog integrated circuit (AIC) that measures the device temperature and a second logic circuit. The second logic circuit receives the enable signal from the first logic circuit, causes the AIC to measure the device temperature, and outputs a ready signal and the device temperature to the first logic circuit. The second logic circuit can also receive a testing signal and the enable signal, and does not output the ready signal and the device temperature to the first logic circuit in response to receiving the testing signal.

BRIEF DESCRIPTION OF THE DRAWINGS

For a detailed description of various examples, reference will now be made to the accompanying drawings in which:

FIG. 2A illustrates a block diagram of an example temperature sensor circuit in the temperature-based tamper detection system shown in FIG. 1.

FIG. 2B illustrates an example temperature sensor for the temperature sensor circuit shown in FIG. 2A.

The same reference number is used in the drawings for the same or similar (either by function and/or structure) features.

DETAILED DESCRIPTION

The disclosed temperature sensing devices are able to respond to tamper attacks that disable the temperature sensor as well as temperature-based tamper attacks and include a security timeout counter and an error code generator. The security timeout counter initiates a countdown when the temperature sensing processes is triggered by an enable signal. During normal operation, the device temperature is measured before the countdown ends, and the timer resets. However, in response to a tamper attack that disables the temperature sensor, the countdown ends without the device temperature being measured. In response to the countdown ending, the security timeout counter outputs a tamper event signal and a timeout signal. The error code generator receives the tamper event signal and generates an error code. In response to the timeout signal, the enable signal is deactivated.

Figure 1:
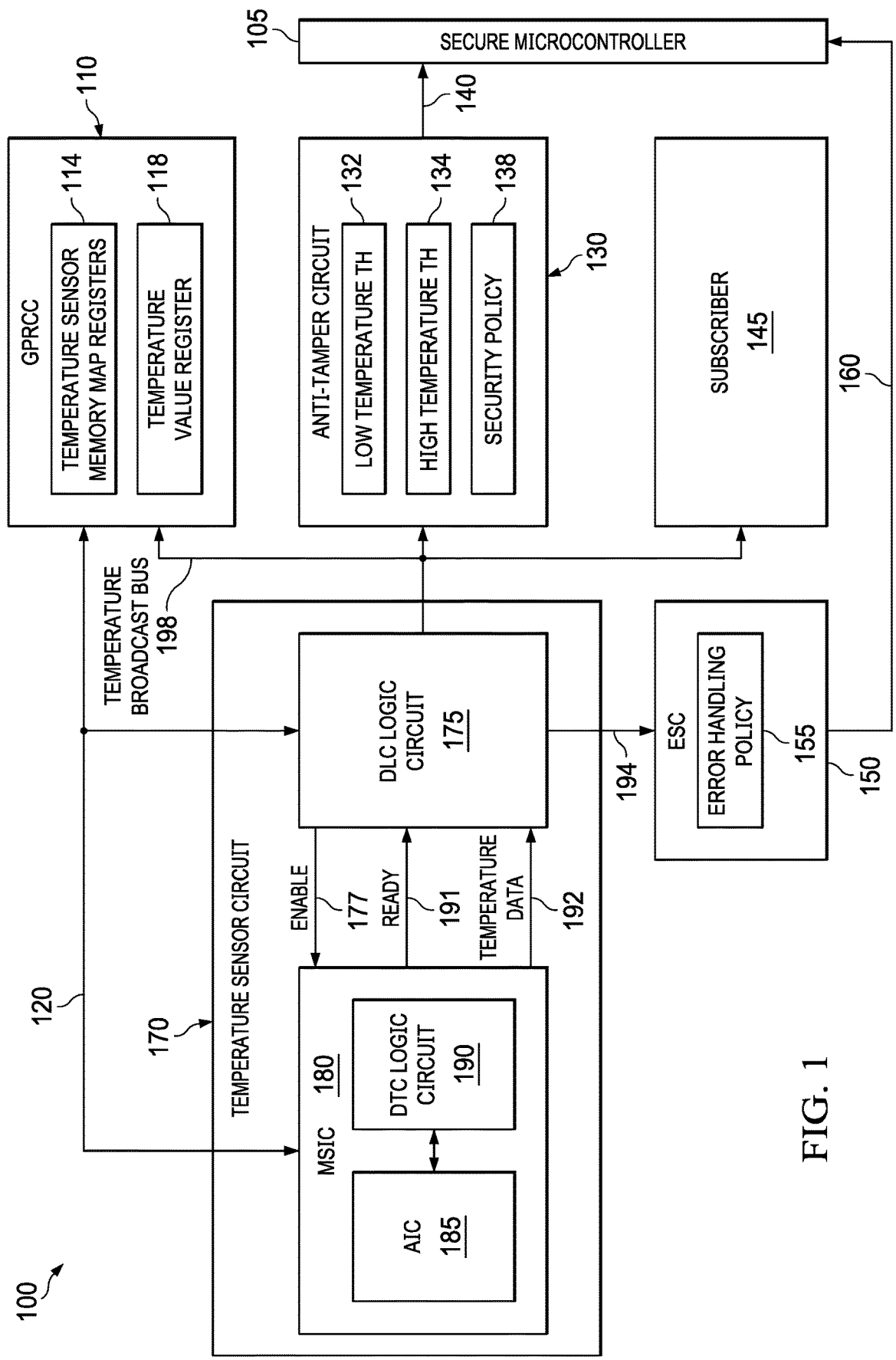
FIG. 1 illustrates a block diagram of an example temperature-based tamper detection system for a secure microcontroller.

FIG. 1 illustrates a block diagram of an example temperature-based tamper detection system 100 for a secure microcontroller 105, which can be on the same or a different die than the temperature-based tamper detection system 100. The tamper detection system 100 includes a global power reset control circuit (GPRCC) 110, an anti-tampering circuit 130, a subscriber 145, an error signaling circuit 150, and a temperature sensor circuit 170. The GPRCC 110 includes a set of temperature sensor memory map registers (TS MMRs) 114 and a temperature value register 118. The set of TS MMRs 114 store values indicative of how frequently to measure an ambient temperature of the system and/or a temperature of one or more particular components in the system, trimming values for the temperature sensor circuit 170, etc. These values can be predetermined during device bootup by the manufacturer, programmed by the user over a serial link to the die containing the system 100, or both. The temperature value register 118 stores the current system temperature as measured by the temperature sensor circuit 170. The GPRCC 110 can use the current system temperature stored in the temperature value register 118 to adjust a supply voltage or a clocking signal (not shown) output by the GPRCC 110 to another circuit.

The anti-tampering circuit 130 includes a low temperature threshold register 132, a high temperature threshold register 134, and a security policy memory 138. The security policy memory 138 may be any appropriate non-transitory computer readable storage medium, such as a static random access memory (SRAM). The low temperature threshold register 132 stores a value indicative of a lowest expected temperature for the system 100 and can be programmed by a user over a serial link to the die containing the system 100. The high temperature threshold register 134 stores a value indicative of a highest expected temperature for the system 100 and can be set by a user. The lowest expected temperature and the highest expected temperature outline an expected temperature range for the system 100, such that a tamper attempt adjusting the temperature of the system outside the expected temperature range is flagged. The security policy memory 138 stores data indicative of the desired security response to a tamper attack. For example, the security policy memory 138 stores data indicative that, responsive to the temperature being outside the temperature range defined by the highest and lowest expected temperatures, system 100 should erase data (e.g., sensitive data) from the secure microcontroller 105, trigger an alarm, etc.

The subscriber 145 is any appropriate circuit that uses temperature readings from the temperature sensor circuit 170. For example, the subscriber 145 can be a clock circuit with a frequency tracking loop that uses temperature, a sample-and-hold based bandgap reference voltage generator that determines the duty cycle of the sample-and-hold circuit based on the measured system temperature, etc. The error signaling circuit 150 includes an error handling policy memory 155 that stores data indicative of a desired response to a tamper event signal 194 from the temperature sensor circuit 170, such as resetting or interrupting an operation by a central processing unit of the secure microcontroller 105, logging the frequency of tamper event signals, etc. The error handling policy memory 155 may be any appropriate non-transitory computer readable storage medium, such as an SRAM.

In this example, the temperature sensor circuit 170 includes a digital loosely-coupled (DLC) logic circuit 175 and a mixed signal integrated circuit (MSIC) 180. The DLC logic circuit 175 and the MSIC 180 receive trimming data, testing and configuration information, etc. from the GPRCC 110 over bus 120. For example, the DLC logic circuit 175 and the MSIC 180 receive data over bus 120 that is indicative of how frequently to measure the temperature. The DLC logic circuit 175 provides a valid data signal and temperature data over temperature broadcast bus 198 to the temperature value register 118 in the GPRCC 110, the anti-tamper circuit 130, and the subscriber 145. The MSIC 180 includes an analog integrated circuit (AIC) 185 and a digital tightly coupled (DTC) logic circuit 190. The DTC logic circuit 190 is designed specifically to work in tandem with the AIC 185 and thus is tightly coupled to the AIC 185. In contrast, the DLC logic circuit 175 is designed to work with a variety of different components, including the GPRCC 110, the anti-tamper circuit 130, the subscriber 145, the error signaling circuit 150, and the MSIC 180, such that it is loosely coupled to multiple circuits rather than tightly coupled to a single circuit or function.

The AIC 185 measures the system temperature (as explained below), and the DTC logic circuit 190 implements a control state machine for the AIC 185 and performs non-linearity corrections on the temperature data from the AIC 185. For example, the temperature data from the AIC 185 can include non-linearities due to manufacturing tolerances in the temperature sensor, and the DTC logic circuit 190 can correct for those known non-linearities. The DLC logic circuit 175 enables a temperature sensing operation by the MSIC 180 using the enable signal 177, and receives the temperature data 192 and a ready signal 191 from the DTC logic circuit 190. The DLC logic circuit 175 broadcasts the valid data signal and the temperature data on temperature broadcast bus 198 in response to the ready signal 191 from the DTC logic circuit 190. Operation of the temperature sensing circuit 170 is described further herein with respect to FIG. 2.

The GPRCC 110 updates the temperature data stored in the temperature value register 118 based on the broadcasted temperature data. The anti-tamper circuit 130 compares the temperature data received from the temperature broadcast bus 198 to the low temperature threshold stored in the low temperature register 132 and to the high temperature threshold stored in the high temperature register 134 to determine whether the system temperature is outside the expected temperature range for the system 100. In response to the temperature being outside the expected range, the anti-tamper circuit 130 outputs a control signal on bus 140 to cause the secure microcontroller 105 to perform an action based on the security policy stored in the memory 138. For example, the secure microcontroller 105 may respond to the control signal by erasing some or all of its data (e.g., data considered to be sensitive enough that the data should be erased).

The subscriber 145 receives the broadcasted temperature data and performs any appropriate action based on the temperature data. For example, where the subscriber 145 is a clock circuit with a frequency tracking loop, the temperature data can be used to adjust operation of the frequency tracking loop. The DLC logic circuit 175 also provides a tamper event signal 194 to the error signaling circuit 150, which outputs a control signal on bus 160 to cause the secure microcontroller 105 to perform an action based on the error handling policy stored in memory 155. For example, the error signaling circuit 150 outputs a control signal to interrupt operation of a central processing unit of the secure microcontroller 105.

FIG. 2A illustrates a block diagram of an example temperature sensor circuit 170 in the temperature-based tamper detection system 100 shown in FIG. 1. The DLC logic circuit 175 includes a security timeout counter 205, an error code generator 210, a broadcast interface (I/F) 220, a DTC I/F 230, a finite state machine (FSM) 240, and a trigger generator 245. The AIC 185 includes a temperature sensor 255, an analog-to-digital converter (ADC) 260, and an internal oscillator 265 for clocking. The DTC logic circuit 190 includes a testing mode logic circuit 270, a startup FSM 275, and a non-linearity correction circuit 280. In the DLC logic circuit 175, the FSM 240 causes the trigger generator 245 to generate an enable signal 250.

The DTC logic circuit 190 in the MSIC 180 receives the enable signal 250 and the startup FSM 275 causes the AIC 185 to measure the system temperature using the temperature sensor 255, shown in FIG. 2B. The temperature sensor 255 includes a bipolar junction transistor (BJT) Q1 configured as a diode by short-circuiting the collector and base junctions of Q1. The emitter junction is coupled to a common mode voltage node 200 (e.g., a ground node). The collector junction is further coupled to a current source 256, which applies a constant current to the BJT Q1. The resulting voltage difference Vbe between the base and emitter junctions is dependent on temperature. The voltage difference represents an analog temperature signal. In other implementations, any appropriate temperature sensing technique may be used. The ADC 260 converts the analog temperature signal 262 into an uncorrected digital temperature signal 264, which is provided to DTC logic circuit 190. The non-linearity correction circuit 280 corrects for non-linearities in the uncorrected digital temperature signal 264 before the DTC logic circuit 190 transmits a ready signal 285 and temperature data 290 to the DTC I/F 230 in the DLC logic circuit 175.

During normal operation, the FSM 240 causes the DTC I/F 230 to forward the valid temperature data 235 to the broadcast I/F 220, which outputs a valid data signal 294 and the system temperature data 298 to the temperature broadcast bus 198. If a tamper attack has prevented the MSIC 180 from sensing the temperature, the ready signal 285 is not transmitted and the DLC logic circuit 175 continues to wait for the ready signal 285. In response to the enable signal 250 being transmitted, the security timeout counter 205 begins a timer. The security timeout counter 205 may implement the timer using a countdown or a count up. The length of the timer can be predetermined during device bootup by the manufacturer based on how long it takes the MSIC 180 to provide the temperature data 290 in response to the enable signal 250. For example, if the MSIC 180 takes four clock cycles to provide the temperature data 290, the length of the timer may be set to a value greater than four clock cycles (e.g. 32 clock cycles).

In response to the ready signal 285 not being asserted before the countdown expires, the security timeout counter 205 outputs the tamper event signal 194 to the error signaling circuit 150 and to the error code generator 210. The security timeout counter 205 also outputs a timeout event signal 225 to the DTC I/F 230, which forwards the timeout event signal 225 to the FSM 240. The FSM 240 causes the trigger generator 245 to stop generating the enable signal 250 in response to the timeout event signal 225. The error code generator 210 generates an error code 215 based on the tamper event signal 194 and provides it to the broadcast I/F 220. The broadcast I/F 220 then outputs the error code in place of the temperature data 298 on temperature broadcast bus 198.

To test that the security timeout counter 205, the error code generator 210, the error handling policy stored in memory 155 of the error signaling circuit 150, and the security policy stored in memory 138 of the anti-tamper circuit 130 are working correctly, the GPRCC 110 sends a testing signal to the DTC logic circuit 190 over bus 120. In response to the testing signal, the testing mode logic circuit 270 prevents the DTC logic circuit 190 from sending the ready signal 285 to DLC logic circuit 175, which allows the security timeout counter 205 to expire and output the tamper event signal 194 and timeout event signal 225, confirming that the security timeout counter 205 is operating properly. The error code generator 210 receives the tamper event signal 194 and generates an error code 215 based on it, confirming the error code generator 210 operates properly. The broadcast I/F 220 outputs the error code on temperature broadcast bus 198 to the anti-tamper circuit 130, which outputs a control signal on bus 140 to cause the secure microcontroller 105 to perform an operation based on the security policy stored in memory 138, confirming the anti-tamper circuit 130 operates properly. The error signaling circuit 150 receives the tamper event signal 194 from the security timeout counter 205, and outputs a control signal on bus 160 to cause the secure microcontroller 105 to perform an operation based on the error handling policy stored in memory 155, confirming the error signaling circuit 150 operates properly. If any of the security timeout counter 205, error code generator 210, anti-tamper circuit 130, and error signaling circuit 150 do not operate as expected, additional troubleshooting and repairs or replacements can be made.

Figure 3:
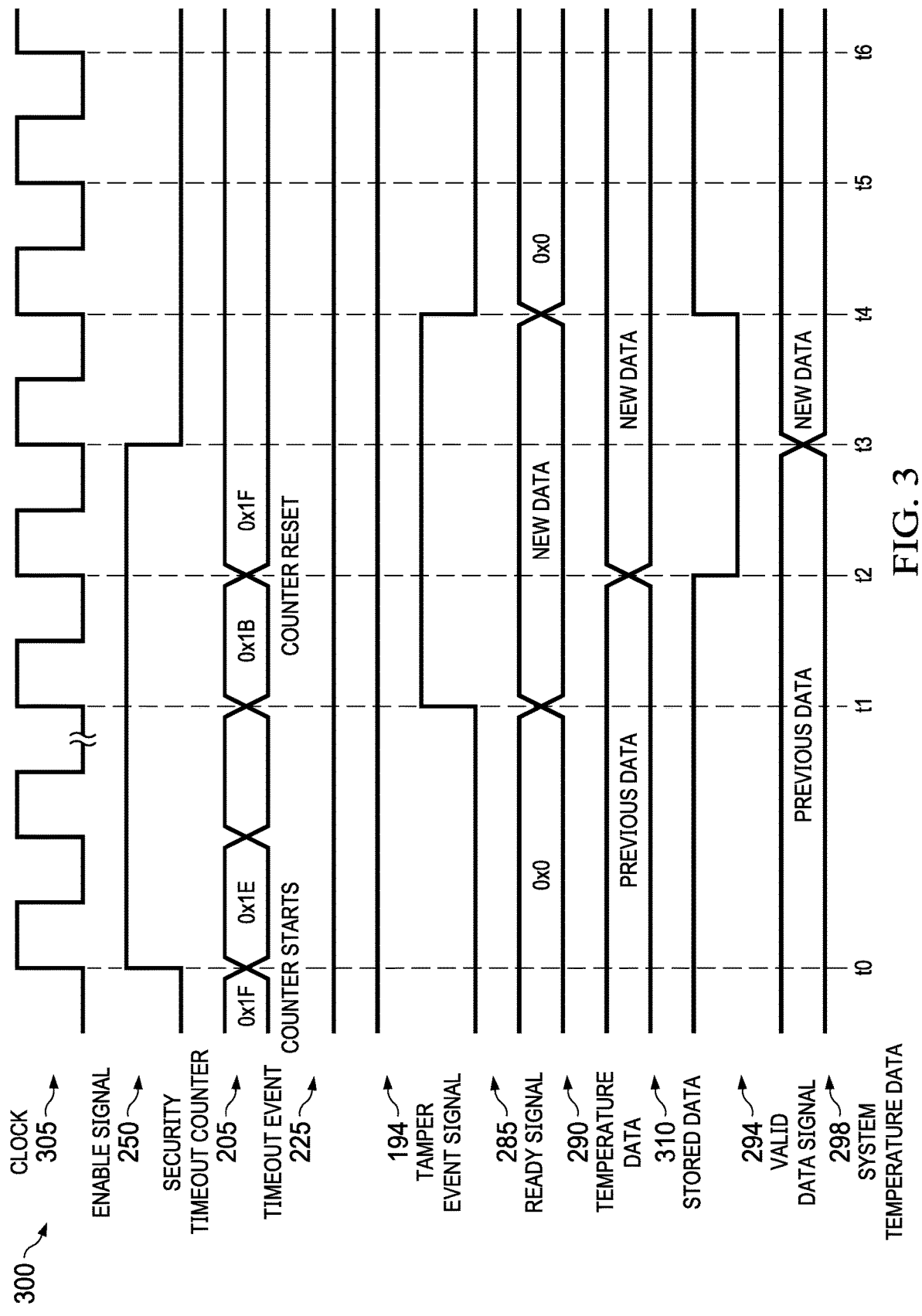
FIG. 3 shows a timing diagram of signals in the temperature-based tamper detection system shown in FIG. 1 during normal operation.

FIG. 3 shows a timing diagram 300 of signals in the temperature-based tamper detection system 100 shown in FIG. 1 during normal operation. In this example, the FSM clock runs at 32 kilohertz (kHz) indicated by the clock signal 305. At t0, the trigger generator 245 sends the enable signal 250 to the DTC logic circuit 190 in the MSIC 180, and the security timeout counter 205 begins counting down from 31, 0x1F in hexadecimal, in this example. The AIC 185 senses the system temperature and provides the updated temperature data 290 to the DTC logic circuit 190, which enables the ready signal 285 at t1 and provides the updated temperature data 290 to the DTC I/F 230.

In response to receiving the ready signal 285, the security timeout counter 205 stops decrementing, in this example at 27, that is, 0x1B in hexadecimal, and so the security timeout event 225 and tamper event signal 194 remain inactive. The security timeout counter value 205 resets to 31, 0x1F in hexadecimal, at time t2 and maintains it because the enable signal 250 is disabled at t3. The security timeout counter value 205 will begin counting down again when the enable signal 250 is sent to the DTC logic circuit 190 again.

The DLC logic circuit 175 stores the updated temperature data as the stored data 310 beginning at time t2. At the same time, the DLC logic circuit 175 disables the valid data signal 294, such that the GPRCC 110, the anti-tamper circuit 130, and the subscriber 145 receiving the valid data signal 294 over the temperature broadcast bus 198 know that updated temperature data is forthcoming. The DLC logic circuit 175 begins transmitting the temperature data 198 over temperature broadcast bus 120 at t3, and enables the valid data signal 294 at t4. The ready signal 285 disables at t4, when the DTC logic circuit 190 finishes transmitting the updated temperature 290 to the DLC logic circuit 175.

Figure 4:
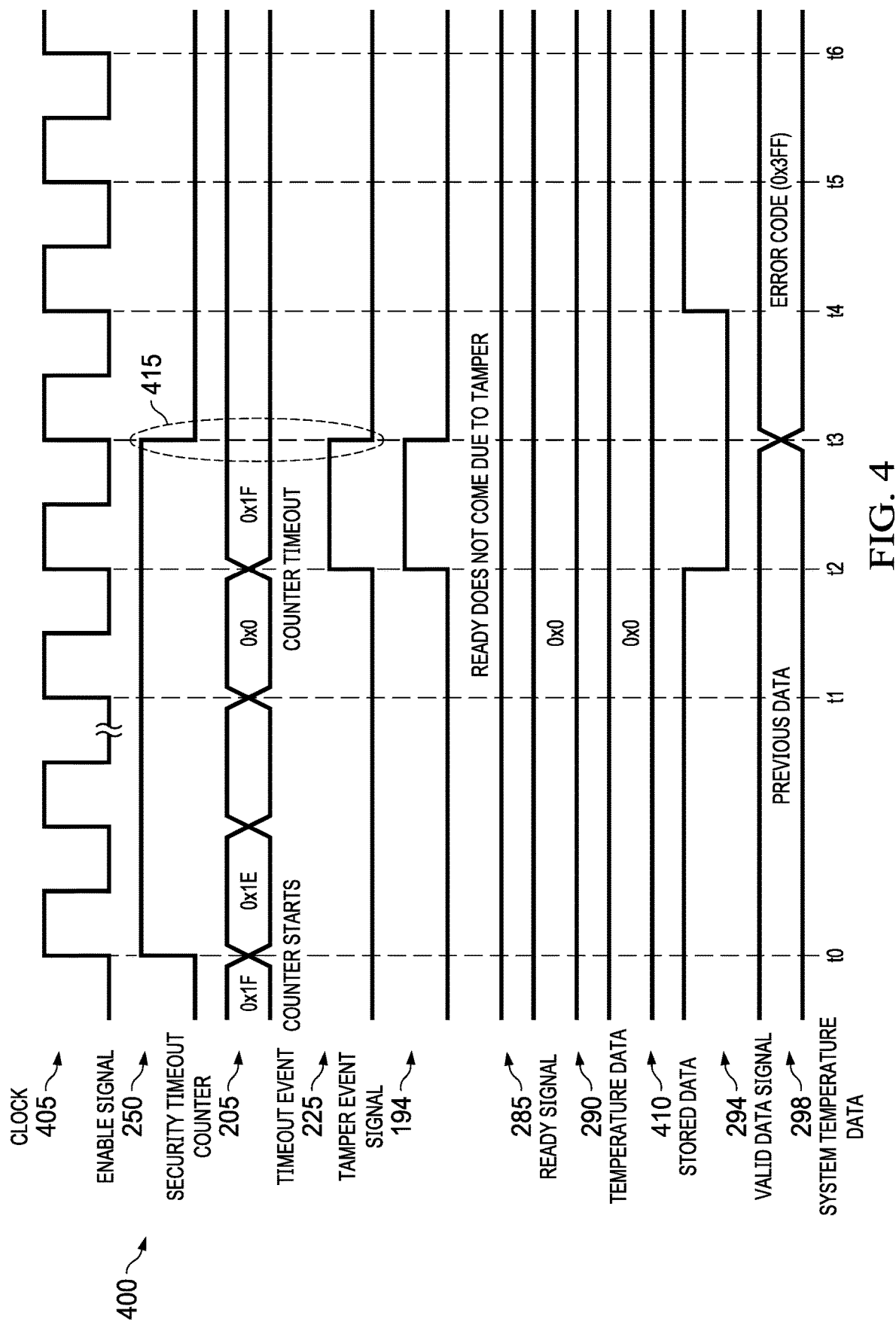
FIG. 4 shows a timing diagram of signals in the temperature-based tamper detection system shown in FIG. 1 in response to a tamper attempt.

FIG. 4 shows a timing diagram 400 of signals in the temperature-based tamper detection system 100 shown in FIG. 1 in response to a tamper attempt. As in the example described in FIG. 3, the FSM clock runs at 32 kHz indicated by the clock signal 405. At t0, the trigger generator 245 sends the enable signal 250 to the DTC logic circuit 190 in the MSIC 180, and the security timeout counter 205 begins counting down from 31, 0x1F in hexadecimal, in this example. The AIC 185 is unable to provide the ready signal 285 and the updated temperature data 290 due to a tamper attack, and so the security timeout counter value 205 reaches zero at t1 before resetting to 31 at t2.

In response to the security timeout counter value 205 reaching zero, the timeout event 225 and the tamper event signal 194 are enabled and the data valid signal 294 is disabled at t2. The error code generator 210 outputs an error code 215 to broadcast I/F 220, which provides the error code 215 in place of the temperature data 298 on bus 198 at t3. The timeout event 225 and the enable signal 250 are disabled at t3, as indicated by the callout 415. The tamper event signal 194 is disabled at t3 as well. The GPRCC 110, the anti-tamper circuit 130, and the subscriber 145 individually determine whether the data provided on temperature broadcast bus 198 is temperature data or an error code and what action to perform in response. For example, the GPRCC 110 compares the received data to the known error code, and in response to a match, the GPRCC 110 does not update the temperature value register 118.

Similarly, the anti-tamper circuit 130 compares the received data to the known error code, and in response to a match, outputs a control signal on bus 140 to cause the secure microcontroller 105 to perform an operation based on the security policy stored in memory 138, such as erasing sensitive data. The subscriber 145 compares the received data to the known error code, and in response to a match, does not perform an operation based on the temperature. Returning to the example where the subscriber 145 is a clock circuit with a frequency tracking loop, the subscriber 145 does not use the error code to adjust operation of the frequency tracking loop and instead maintains current operation. The error signaling circuit 150 receives the tamper event signal 194 from the security timeout counter 205, and outputs a control signal on bus 160 to cause the secure microcontroller 105 to perform an operation based on the error handling policy stored in memory 155, such as interrupting operation of a central processing unit of the secure microcontroller 105.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

While the use of particular transistors is described herein, other transistors (or equivalent devices) may be used instead. For example, a p-type metal-oxide-silicon field effect transistor ("MOSFET") may be used in place of an n-type MOSFET with little or no changes to the circuit. Furthermore, other types of transistors may be used (such as bipolar junction transistors (BJTs)).

Unless otherwise stated, "about," "approximately," or "substantially" preceding a value means +/−10 percent of the stated value. Modifications are possible in the described examples, and other examples are possible within the scope of the claims.

Modifications are possible in the described embodiments, and other embodiments are possible, within the scope of the claims.

What is claimed is:

1. A temperature sensing device, comprising:
    a mixed signal circuit configured to measure a device temperature; and
    a logic circuit configured to:
        send an enable signal to the mixed signal circuit to cause the mixed signal circuit to measure the device temperature;
        initiate a timer to run for at least a set time from the time that the enable signal is sent; and
        in response to not receiving from the mixed signal circuit, within the set time, at least one of the device temperature and a ready signal indicating that the device temperature is available, disable the enable signal and output a tamper event signal and an error code that is indicative of a temperature outside of a device operating temperature range.

2. The temperature sensing device of claim 1, wherein disable the enable signal includes one of de-asserting the enable signal and stopping transmission of the enable signal.

3. The temperature sensing device of claim 1, further comprising an error signaling circuit configured to:
    store an error handling policy comprising a desired system response to the tamper event signal;
    receive the tamper event signal from the logic circuit; and
    in response to receiving the tamper event signal, perform an operation based on the stored error handling policy.

4. The temperature sensing device of claim 1, further comprising an anti-tamper circuit configured to:
    store a security policy comprising a desired security response to the error code;
    receive the error code from the logic circuit; and
    in response to receiving the error code, perform an operation based on the stored security policy.

5. The temperature sensing device of claim 4, wherein:
    the logic circuit is further configured to:
        receive the device temperature from the mixed signal circuit; and
        output the device temperature; and
    the anti-tamper circuit is further configured to:
        store a high temperature threshold and a low temperature threshold defining the device operating temperature range;
        receive the device temperature from the logic circuit;
        compare the device temperature to the high temperature threshold and the low temperature threshold; and
        in response to the device temperature being greater than the high temperature threshold or lower than the low temperature threshold, perform an operation based on the stored security policy.

6. The temperature sensing device of claim 1, wherein the logic circuit is a first logic circuit, and wherein the mixed signal circuit comprises an analog circuit configured to measure the device temperature and a second logic circuit configured to:

receive the enable signal from the first logic circuit;
cause the analog circuit to measure the device temperature; and
output the ready signal and the device temperature to the first logic circuit.

7. The temperature sensing device of claim 6, wherein the second logic circuit is further configured to:
receive a testing signal and the enable signal; and
in response to receiving the testing signal, withhold output of the ready signal and the device temperature to the first logic circuit.

8. An apparatus, comprising:
a trigger generator configured to output an enable signal;
a first interface configured to receive a ready signal and an apparatus temperature;
a timeout counter configured to:
  initiate a timer when the enable signal is output; and
  in response to the first interface not receiving, within a set time after the enable signal is output, at least one of the apparatus temperature and the ready signal, output a tamper event signal and a timeout event signal;
a finite state machine (FSM) configured to:
  cause the trigger generator to output the enable signal; and
  in response to receiving the timeout event signal, cause the trigger generator to stop outputting the enable signal;
an error code generator configured to:
  receive the tamper event signal when the tamper event signal is output; and
  generate an error code when the tamper event signal is output; and
a second interface configured to:
  output a valid data signal and the apparatus temperature in the absence of receiving the error code from the error code generator and in response to a control signal received from the FSM; and
  in response to receiving the error code, output the valid data signal and the error code.

9. The apparatus of claim 8, further comprising a mixed signal integrated circuit (MSIC), wherein the MSIC comprises an analog integrated circuit (AIC) configured to measure the apparatus temperature and a logic circuit configured to:
receive the enable signal;
cause the AIC to measure the apparatus temperature; and
output the ready signal and the apparatus temperature.

10. The apparatus of claim 9, wherein the AIC comprises:
a temperature-sensing transistor;
an analog-to-digital converter; and
an internal oscillator.

11. The apparatus of claim 9, wherein the logic circuit comprises:
a startup FSM;
a testing logic circuit configured to:
  receive a testing signal and the enable signal; and
  in response to receiving the testing signal, prevent the MSIC from outputting the ready signal and the apparatus temperature; and
a non-linearity correction circuit configured to perform a correction operation on the apparatus temperature from the AIC.

12. The apparatus of claim 11, further comprising a global power reset control circuit (GPRCC), wherein:

the GPRCC comprises:
  a temperature value register configured to store the apparatus temperature; and
  a set of temperature sensor memory map registers configured to store an operation policy for the apparatus, wherein the operation policy comprises at least one of a frequency policy indicative of how often to measure the apparatus temperature, trimming values, and an apparatus testing protocol; and
the GPRCC is configured to output the testing signal.

13. The apparatus of claim 8, further comprising an error signaling circuit, wherein:
the error signaling circuit comprises a memory configured to store an error handling policy;
the error handling policy comprises a desired system response to the tamper event signal; and
the error signaling circuit is configured to:
  receive the tamper event signal; and
  perform an operation based on the stored error handling policy.

14. The apparatus of claim 8, further comprising an anti-tamper circuit, wherein the anti-tamper circuit comprises:
a low temperature register configured to store a low temperature threshold;
a high temperature register configured to store a high temperature threshold; and
a memory configured to store a security policy comprising a desired security response to the error code.

15. The apparatus of claim 14, wherein the anti-tamper circuit is configured to:
receive the error code; and
in response to receiving the error code, perform an operation based on the stored security policy.

16. The apparatus of claim 15, wherein the anti-tamper circuit is further configured to:
receive the apparatus temperature;
compare the apparatus temperature to the high temperature threshold and the low temperature threshold; and
in response to the apparatus temperature being greater than the high temperature threshold or lower than the low temperature threshold, perform an operation based on the stored security policy.

17. A method, comprising:
asserting an enable signal to cause an integrated circuit (IC) to measure a device temperature;
initiating, by a logic circuit of the device in response to transmission of the enable signal, a timer to run from the time that the enable signal is sent;
determining, by the logic circuit, whether at least one of the device temperature and a ready signal indicating that the device temperature is available is received within a set time from a time at which the enable signal is asserted;
in response to determining that neither the device temperature nor the enable signal is received within the set time, disabling the enable signal; and
in response to determining that neither the device temperature nor the enable signal is received within the set time, outputting a tamper event signal and an error code, wherein the error code is indicative of a temperature outside of a device operating temperature range.

18. The method of claim 17, further comprising:
outputting a valid data signal and the device temperature when it is determined that the ready signal is received within the set time.

19. The method of claim 18, wherein disabling the enable signal includes stopping transmission of the enable signal.

20. The method of claim 17, further comprising:
    storing an error handling policy comprising a desired system response to the tamper event signal, and
    performing, in response to the tamper event signal, an operation based on the stored error handling policy.

21. The method of claim 17, further comprising:
    storing a security policy comprising a desired security response to the error code; and
    performing, in response to the error code, an operation based on the stored security policy.

22. The method of claim 17, further comprising:
    receiving, by the IC, a testing signal and the enable signal; and
    preventing transmission, by the IC and in response to the testing signal, of the device temperature.

\* \* \* \* \*